July 6, 1948.
C. D. MATHER
2,444,707
MECHANICAL FISH BAIT
Filed March 22, 1946
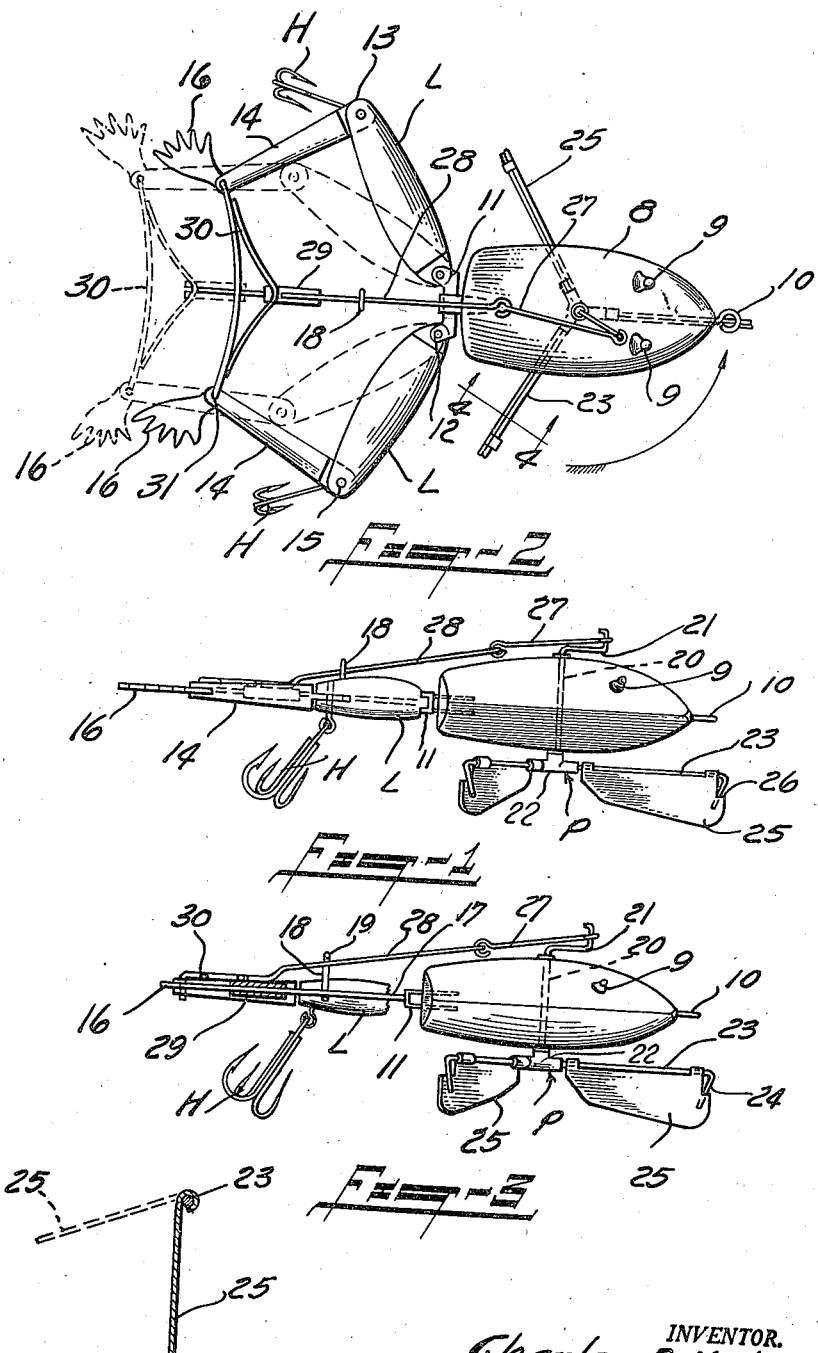

Patented July 6, 1948

2,444,707

UNITED STATES PATENT OFFICE 2,444,707

MECHANICAL FISH BAIT

Charles D. Mather, Essexville, Mich.

Application March 22, 1946, Serial No. 656,251

6 Claims. (Cl. 43—43)

This invention relates to artificial fish baits and more particularly to an animated fish lure for catching game fish in general.

One of the prime objects of the invention is to design an animated fish lure that has every appearance and characteristic of a live frog as it is drawn through the water.

Another object is to provide an animated bait provided with propeller mechanism for actuating the legs etc. as the bait is drawn through the water.

A further object is to provide an artificial bait provided with means for driving the actuating mechanism as the bait is pulled through the water.

A still further object is to provide an artificial fish bait which can be easily attached, which shows animation in its body and legs when in use, and which can be readily manufactured and assembled.

With the above and other objects in view, the present invention consists in the combination and arrangement of parts, hereinafter more fully described, illustrated in the accompanying drawing, and more particularly pointed out in the appended claims, it being understood that changes may be made in the size, form, proportion, and minor details of construction, without departing from the spirit, or sacrificing any of the advantages of the invention.

In the drawing:

Fig. 1 is a side-elevational view of my improved animated bait.

Fig. 2 is a top plan view thereof, the broken lines illustrating the leg movement.

Fig. 3 is a part-sectional, side-elevational view.

Fig. 4 is an enlarged, sectional view of the propeller taken on the line 4—4 of Fig. 2, the broken lines showing the blade swung up.

Referring now to the drawing in which I have shown the preferred embodiment of my invention, the numeral 8 indicates the main supporting body member, and this can be formed of wood, plastic, metal or any other material suitable for a fish lure of this nature.

Eyes 9 are provided in the body as usual, and a fish line attaching eye 10 is provided in the nose as shown to facilitate the attachment of a fish line in the usual manner. A metal clip 11 is anchored to the rear end of the body 8 in any approved manner, and legs L are pivotally secured to said clip by means of pins 12, these legs being jointed as at 13, the outer ends 14 being pivotally connected by means of pins 15 as usual, said legs terminating in webbed feet 16 to simulate a live frog.

A horizontally disposed, rearwardly extending guide rod 17 is rigidly attached to the clip member 11, and a vertically disposed section 18 is fixedly mounted thereon, said section having an eye 19 in the upper end thereof and for a purpose to be presently described.

The bait is adapted to be propeller-actuated as it is drawn through the water, a vertically disposed propeller shaft 20 being journaled in the body 8, the upper end being shaped to form a crank 21, and a propeller P being mounted on the lower end of said shaft, said propeller being formed with a hub 22 mounted on the lower end of the shaft, and outwardly diverging spokes 23 mounted through said hub with the ends 24 being bent downwardly as shown.

Blades 25 are hingedly mounted on the spokes 23, the outer end of each blade being cut away as at 26 to accommodate the depending section 24 of the spokes, forming a stop to limit the swinging movement in one direction, but leaving it free to swing backwards in the opposite direction. For example, as the bait is pulled through the water, the pressure on the side of the blade opposite the stop tends to rotate the propeller, this pressure gradually diminishing as the propeller is rotated and the blade approaches vertical alignment with the longitudinal center line of the bait, past which point the opposite side of the blade is presented to the direction of travel so that the water pressure swings the blade on its spoke and to position as shown in broken lines in Fig. 4 of the drawing, the blade again dropping to vertical position after it has reached the longitudinal center line of the bait body.

In other words, each blade is in vertical position with the water pressure forcing it against the stop 24 during its travel through an arc of 180 degrees, past the point at which the opposite side of the blade faces the direction in which the bait is being pulled so that the pressure tends to swing the blade upwardly as clearly shown in Fig. 4 of the drawing.

One end of a link 27 is connected to the outer end of the crank 21, the opposite end being connected to a connecting rod 28 as shown, said rod projecting through the eye 19 of the support 18, the free end being connected to a slide 29 which is slidably mounted on the guide rod 17.

A transversely disposed curved bridle 30 is rigidly connected to the slide 29, the ends of said bridle, preferably formed of wire bent to shape, being pivotally connected to the ends 14 of the legs L at the points 31, so that as the propeller is actuated, the connecting rod 28 will be reciprocated and the movement of the legs 12 will be synchronized.

The bait is especially adaptable for casting and trolling, and as it is drawn through the water, the propeller P is rotated, the crank 21 actuates the rod 28 through instrumentality of the link member 27, providing a reciprocating motion of the slide 29 on the guide 17, and inasmuch as the member 30 is rigidly connected to the slide 29 and forms a part of the reciprocated structure with its ends pivotally connected to the legs, it will be obvious that reciprocation of the slide 29 will actuate the legs to simulate the leg movement of a live frog when swimming, and rotation of the propeller provides water turbulence similar to that produced by the frog's front legs.

The movements attract the attention of the fish so that when the strike is made, the fish is impaled and caught on the hooks H which are connected to the pins 15 that form the joints in the legs.

From the foregoing description, it will be clearly obvious that I have perfected a very simple, practical and substantial fish lure whereby live fish are induced to strike out at the bait and thereby become impaled upon the fishhooks and caught.

What I claim is:

1. A fish bait of the character described comprising, a body member to which a fish line is adapted to be attached, a vertically disposed propeller shaft mounted in the body, a crank on the upper end thereof, a propeller mounted on the lower end of the shaft, legs pivotally connected to said body member, a connecting rod, a link pivotally connecting said crank and rod, means connected to said connecting rod for actuating said legs as the propeller is driven, and hooks connected to said legs.

2. A construction as defined in claim 1 in which the propeller is equipped with pivotally connected blades, and stops for limiting the swinging movement of the blade in one direction.

3. A construction as defined in claim 1 in which the legs are jointed, and means for guiding the legs as the connecting rod is actuated.

4. A construction as defined in claim 1 in which a horizontally disposed guide projects rearwardly from the body, and a vertically disposed eye intermediate the length of the guide and in which the connecting rod is slidably movable, said legs-actuating means comprising a slide on said guide, and a bridle mounted on said slide and having pivotal connection with the legs for synchronizing the movement of the legs as the propeller is driven.

5. A mechanical fish bait of the class described comprising a body member having a fish line attached thereto for drawing it through the water, a propeller shaft journaled in the body, legs pivotally connected to said body, a crank on one end of the shaft, a propeller on the opposite end, a horizontally disposed guide rod projecting from the rear end of the body, a slide movably mounted thereon and having pivotal connection with said legs, and links connecting said slide and crank for reciprocating said slide when the propeller is actuated.

6. A construction as defined in claim 5 in which the legs are jointed, and fishhooks connected to the jointed section of the legs.

CHARLES D. MATHER.

REFERENCES CITED

The following references are of record in the file of this patent:

UNITED STATES PATENTS

| Number | Name | Date |
|---|---|---|
| 638,885 | Peterson et al. | Dec. 12, 1899 |
| 2,221,381 | Hosmer | Nov. 12, 1940 |